United States Patent
Sandgren

(10) Patent No.: US 10,899,396 B2
(45) Date of Patent: Jan. 26, 2021

(54) AUTOMATED DRAG REDUCTION IN MOVING OBJECTS

(71) Applicant: Eric Sandgren, Las Vegas, NV (US)

(72) Inventor: Eric Sandgren, Las Vegas, NV (US)

(*) Notice: Subject to any disclaimer, the term of this patent is extended or adjusted under 35 U.S.C. 154(b) by 246 days.

(21) Appl. No.: 15/901,665

(22) Filed: Feb. 21, 2018

(65) Prior Publication Data

US 2018/0178859 A1 Jun. 28, 2018

Related U.S. Application Data

(63) Continuation of application No. 12/850,477, filed on Aug. 4, 2010, now Pat. No. 9,937,963.

(60) Provisional application No. 61/273,431, filed on Aug. 4, 2009.

(51) Int. Cl.
*B62D 35/00* (2006.01)
*B62D 35/02* (2006.01)
*B60N 2/00* (2006.01)
*E05F 15/695* (2015.01)

(52) U.S. Cl.
CPC ........... *B62D 35/001* (2013.01); *B60N 2/002* (2013.01); *B62D 35/00* (2013.01); *B62D 35/007* (2013.01); *B62D 35/02* (2013.01); *E05F 15/695* (2015.01); *E05Y 2900/546* (2013.01); *Y02T 10/88* (2013.01)

(58) Field of Classification Search
CPC . E05Y 2900/546; E05F 15/695; B60N 2/002; B62D 35/001; B62D 35/007; B62D 35/02; B62D 35/00; Y02T 10/88
USPC .......................................................... 701/49
See application file for complete search history.

(56) References Cited

U.S. PATENT DOCUMENTS

| | | |
|---|---|---|
| 2,737,411 A | 3/1956 | Potter |
| 2,800,291 A | 7/1957 | Stephens |
| 3,951,445 A | 4/1976 | Tatom |
| 3,999,797 A | 12/1976 | Kirsch et al. |
| 4,102,548 A | 7/1978 | Kangas |
| 4,131,309 A | 12/1978 | Henke |
| 4,142,755 A | 3/1979 | Keedy |
| 4,214,787 A | 7/1980 | Chain |
| 4,257,641 A | 3/1981 | Keedy |
| 4,320,920 A | 3/1982 | Goudey |
| 4,360,232 A | 11/1982 | Elder |
| 4,427,229 A | 1/1984 | Johnson |
| 4,451,074 A | 5/1984 | Scanlon |

(Continued)

*Primary Examiner* — Nathan C Uber
*Assistant Examiner* — Fawaad Haider
(74) *Attorney, Agent, or Firm* — Howard & Howard Attorneys PLLC

(57) ABSTRACT

A vehicle including a drag reduction system is described herein. The drag reduction system includes an eddy disrupter element mounted on a vehicle body and movable with respect to the vehicle body, a plurality of sensors mounted to the vehicle body, and a processor programmed to operate the eddy disrupter based on signals received from the sensors. The plurality of sensors include a first sensor mounted near the rear end of the vehicle body and a second sensor mounted near the front end of the vehicle body for measuring fluid pressure adjacent to the vehicle body. The processor is programmed to operate the eddy disrupter element to adjust a position of the eddy disrupter element relative to the surface of the vehicle body based on a comparative analysis of a measured fluid pressure received from the first sensor and a measure fluid pressure received from the second sensor.

20 Claims, 7 Drawing Sheets

(56) References Cited

U.S. PATENT DOCUMENTS

| | | |
|---|---|---|
| 4,455,045 A | 6/1984 | Wheeler |
| 4,458,936 A | 7/1984 | Mulholland |
| 4,508,380 A | 4/1985 | Sankrithi |
| 4,601,508 A | 7/1986 | Kerian |
| 4,682,808 A | 7/1987 | Bilanin |
| 4,702,509 A | 10/1987 | Elliott, Sr. |
| 4,741,569 A | 5/1988 | Sutphen |
| 4,818,015 A | 4/1989 | Scanlon |
| 4,978,162 A | 12/1990 | Labbe |
| 5,058,837 A | 10/1991 | Wheeler |
| 5,058,945 A | 10/1991 | Elliott, Sr. et al. |
| 5,209,438 A | 5/1993 | Wygnanski |
| 5,236,347 A | 8/1993 | Andrus |
| 5,280,990 A | 1/1994 | Rinard |
| 5,289,997 A | 3/1994 | Harris |
| 5,348,366 A | 9/1994 | Baker et al. |
| 5,429,411 A | 7/1995 | Spears |
| 5,498,059 A | 3/1996 | Switlik |
| 5,884,872 A | 3/1999 | Greenhalgh |
| 5,908,217 A | 6/1999 | Englar |
| 5,947,548 A | 9/1999 | Carper et al. |
| 6,092,861 A | 7/2000 | Whelan |
| 6,257,654 B1* | 7/2001 | Boivin ............... B62D 35/001 296/180.4 |
| 6,286,894 B1 | 9/2001 | Kingham |
| 6,309,010 B1 | 10/2001 | Whitten |
| 6,378,932 B1* | 4/2002 | Fasel ............... B62D 35/001 296/180.5 |
| 6,409,252 B1 | 6/2002 | Andrus |
| 6,485,087 B1 | 11/2002 | Roberge et al. |
| 6,959,958 B2 | 11/2005 | Basford |
| 7,104,143 B1 | 9/2006 | Powell |
| 7,150,434 B1 | 12/2006 | Bandyopadhyay |
| 7,255,387 B2 | 8/2007 | Wood |
| 7,305,893 B2 | 12/2007 | Powell et al. |
| 7,334,468 B2 | 2/2008 | Browne et al. |
| 7,334,760 B1* | 2/2008 | Lisy ............... B64C 23/06 244/203 |
| 7,431,381 B2 | 10/2008 | Wood |
| 7,641,262 B2* | 1/2010 | Nusbaum ............ B62D 35/001 296/180.5 |
| 2002/0021023 A1 | 2/2002 | Leban |
| 2003/0011210 A1 | 1/2003 | Cory |
| 2006/0103167 A1* | 5/2006 | Wong ............... B62D 35/001 296/180.1 |

* cited by examiner

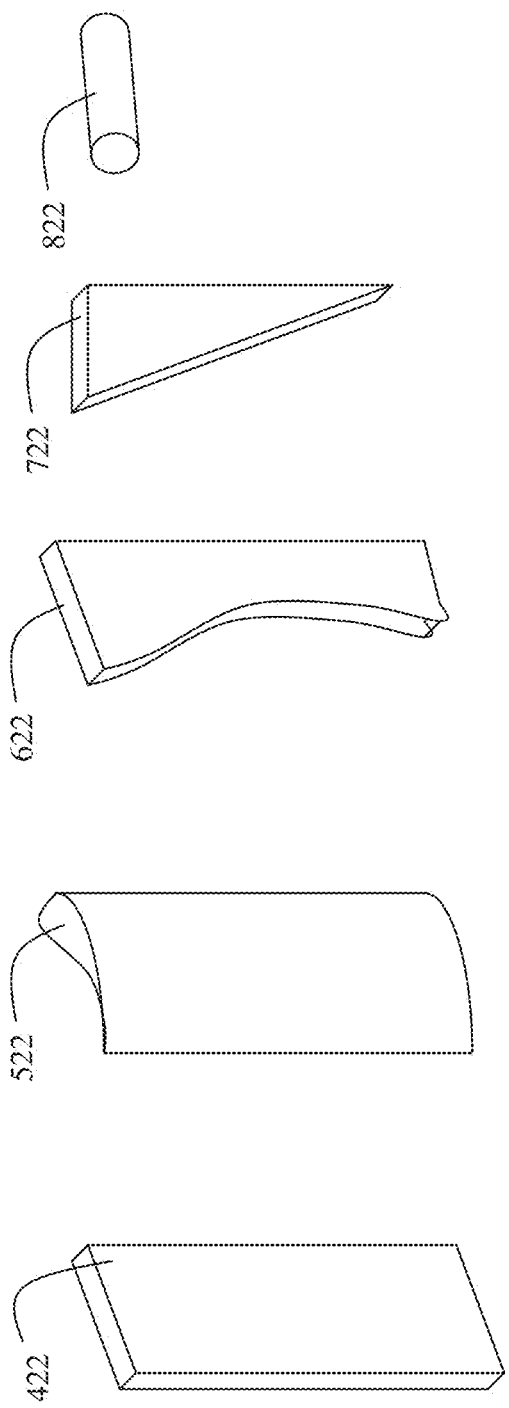

AUTOMATED DRAG REDUCTION IN MOVING OBJECTS

CROSS-REFERENCE TO RELATED APPLICATION

This application is a continuation of U.S. patent application Ser. No. 12/850,477, filed Aug. 4, 2010, which claims benefit of U.S. Provisional Application No. 61/273,431, filed on Aug. 4, 2009, the disclosures of which are hereby incorporated by reference in their entirety for all purposes.

BACKGROUND OF THE INVENTION

Field of the Invention

The invention relates to the field of drag reduction in moving objects, particularly drag reduction in objects moving through fluids, and more particularly to methods and systems for reducing air drag on land-based vehicles moving on roadways.

Background of the Art

The wake formed behind a moving body, particularly a road-based vehicle, can be many multiples of the vehicle length. The cross-sectional area of the wake also generally expands well beyond that of the vehicle. The wake is a complex, time dependent fluid flow phenomena that has the general effect of producing a low pressure area following the vehicle. It contains both coherent and non-coherent vortex structures that contribute significantly to the building and expansion of the wake region behind the vehicle. The difference between the high pressure generated at the front of the vehicle and the low pressure wake region directly behind the vehicle exerts a net force which is opposite to the direction of motion of the vehicle. The energy required to form and sustain the wake must come from the vehicle power source, therefore the wake has a significant negative impact on the fuel consumption rate of the vehicle.

The drag caused by wakes, currents and eddies adjacent to vehicles has significant impact on forces affecting the efficiency of vehicle movement and energy use on the vehicles. Much effort has been put into aerodynamic design on vehicles to reduce drag to increase fuel efficiencies. Drag, especially at speeds above 30 km/hour, becomes increasingly important in fuel efficiency and is still a major concern for vehicle manufactures.

Many drag reduction devices have been proposed in the technical and patent literature. The majority of the aerodynamic-alteration devices developed or proposed to date are fixed devices that actually interfere with normal operation of the trailer, particularly loading and unloading operations. Because they are fixed, previously proposed devices tended to function adequately only under optimal conditions; their effectiveness is negated by changing environmental conditions and road geometry. These devices included streamlining or boat tail add-on devices, fixed plate extensions at the rear of the vehicle, suction and blowing devices, flaps and fairings, underbody skirts and wedges, tractor/trailer gap flow control devices and, more recently, flapping devices to add energy content to the wake region at a specific frequency.

Many of these devices have been evaluated and tested by government laboratories and trucking associations. Considerable work, including a significant amount funded by the U.S. Department of Energy (DOE), has been performed on creating and evaluating drag reduction technologies for large trucks. One such major study was the DOE Project on Heavy Vehicle Aerodynamic Drag, which was conducted over a three year period. An on-road test of drag reduction concepts has been completed by the Truck Manufacturers Association in conjunction with the DOE. A significant number of patents cover a wide range of concepts developed to date. However, none of these technologies have demonstrated the actual capability to achieve the benefits sought.

SUMMARY OF THE INVENTION

The invention is directed to a system for reducing drag on a vehicle body moving through fluid. In some embodiments, the system includes a sensor mounted on the vehicle body for measuring data adjacent to the vehicle body surface; an eddy disrupter element mounted on the vehicle body for motion to a transverse position relative to the plane of the vehicle body surface; and a processor for facilitating a comparative analysis of the measured data with a threshold condition to determine if the threshold condition is satisfied, wherein the threshold condition is associated with drag resulting from the vehicle body movement through the fluid that can be reduced by the motion of the eddy disrupter element to a transverse position relative to the plane of the vehicle body surface and wherein the element is responsive to satisfaction of the threshold condition.

In some embodiments of the aforementioned system, the sensor is configured for measuring fluid pressure.

In some embodiments of the aforementioned system, the sensor is mounted to measure fluid pressure adjacent to the rear surface of the vehicle body.

In some embodiments of the aforementioned system, the eddy disrupter includes a front edge relative to the front of the vehicle and a rear edge relative to the rear of the vehicle. The front edge is mounted on the vehicle for pivotal motion and the rear edge is configured for pivoting to a transverse position relative to the vehicle body surface.

In some embodiments of the aforementioned system, the eddy disrupter element is substantially in the shape of an elongated panel wherein the rear edge corresponds with a longitudinal side.

In some embodiments of the aforementioned system, the eddy disrupter element is mounted on the side of the vehicle body.

In some embodiments of the aforementioned system, the eddy disrupter element is mounted on the vehicle body for movement to a position in which the eddy disrupter element is substantially planar with respect to the vehicle body surface.

In some embodiments of the aforementioned system, the processor is configured for receiving data relating to vehicle operation, efficiency or movement to facilitate the comparative analysis.

The invention is also directed to a method of reducing drag on a vehicle body moving through fluid. In some embodiments, the method includes the steps of: sensing a condition relating to the fluid adjacent to a portion of the vehicle body; comparing the sensed condition with a threshold condition to determine if the threshold condition is satisfied, wherein the threshold condition is associated with drag resulting from the vehicle body movement through the fluid that can be reduced by the motion of an eddy disrupter element mounted on the vehicle body to a transverse position relative to the plane of the vehicle body surface; and actuating movement of the eddy disrupter element to the transverse position relative to the plane of the vehicle if the threshold condition is satisfied.

In some embodiments of the aforementioned method, the step of sensing a condition relating to the fluid adjacent to a portion of the vehicle body further comprises measuring the fluid pressure.

In some embodiments of the aforementioned method, the fluid pressure is measured at the rear surface of the vehicle body.

In some embodiments of the aforementioned method, the step of comparing the sensed condition with a threshold condition further comprises considering the velocity of the vehicle.

In some embodiments of the aforementioned method, the step of actuating movement of the eddy disrupter element further comprises moving the eddy disrupter from a substantially non-transverse position to the transverse position.

In some embodiments of the aforementioned method, the timing of the step of actuating movement of the eddy disrupter element may be varied.

The invention is also directed to a vehicle that moves through fluid which employs a system or method as described herein to reduce drag. In some embodiments, the vehicle includes a vehicle body defining front, rear, side, top and bottom surfaces, wherein at least one surface of the vehicle body causing drag as the vehicle moves through a fluid; at least one sensor on the vehicle body that senses pressure changes on at least one surface of the vehicle body as the vehicle moves through the fluid; a processor receiving signals from the sensors relating to sensed pressure changes for facilitating a comparative analysis between the sensed pressure changes and drag on the vehicle body; at least one element mounted on at least one surface of the vehicle body in a forward position relative to the rear surface of the vehicle configured for movement to a transverse position in relation to the at least one surface in response to signals from the processor and a program executable by the processor that sends signals to the at least one element while the vehicle is moving causing the at least one element to move in a manner that will at least partially and physically disrupt at least some eddies on the at least one surface before the eddies reach the rear surface of the vehicle body, wherein the disruption of the eddies reduces overall drag on the vehicle as the vehicle moves through the fluid.

The fluid may be air, which may include particles or particulates entrained therein, and the aforementioned disruption may therefore reduce the existing amount of entrained particles or particulates, as well as facilitate a reduction of additional particles or particulates, such as dust or sand, which might have otherwise been entrained in the wake as a result of the vehicle movement. This may be particularly useful for vehicles traveling through sandstorms, desert areas or other off-road environments, among other things.

The vehicle may be an automobile, such as a truck or car.

The at least one element of the aforementioned vehicle may comprise at least one panel moveable on at least one surface of the vehicle body to disrupt eddies in advance of the rear surface.

The vehicle may also include a motor that moves the at least one panel which is responsive to signals from the processor to pivot the panel about 10° with respect to the vehicle surface and in the direction of the front surface of the vehicle body in less than about one second.

The at least one panel of the aforementioned vehicle may be present on at least one surface of the vehicle selected from the group consisting of a top surface of the vehicle and side surfaces of the vehicle, the at least one surface has a length, and the at least one panel is located at least about 25% of said length away from said rear surface.

The invention is also directed to a system in which sensors are positioned on a vehicle body in one or more positions. These sensors sense pressure changes on the moving body that are related to drag or may be direct measurements of drag, instantaneous fuel consumption or some other relevant factor. Upon indication of a threshold change in pressure indicating the eddies are forming on at least one surface of the moving bodies, eddy disruptor elements are engaged to disrupt eddies on the surface of the moving body and to appropriately alter the sensed pressure change so as to reduce drag.

BRIEF DESCRIPTION OF THE FIGURES

FIG. 7 is a schematic diagram illustrating a perspective view of exemplary eddy disrupter elements which may be employed according to some embodiments of the invention.

DETAILED DESCRIPTION OF THE INVENTION

Figure 1:
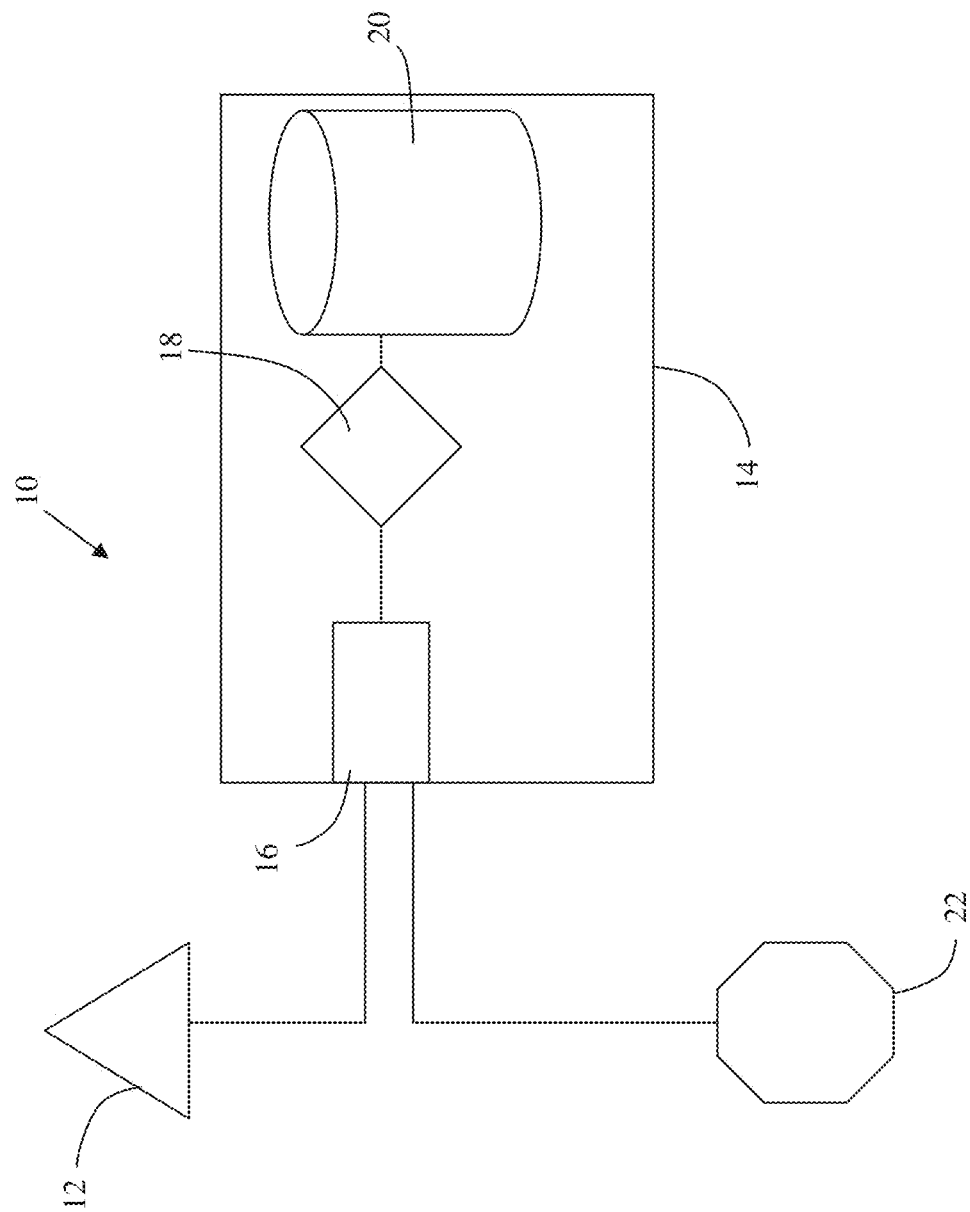
FIG. 1 is a schematic diagram illustrating an exemplary embodiment of a system constructed in accordance with the invention.

FIG. 1 illustrates a schematic diagram of an exemplary system constructed according to some embodiments of the invention and generally referred to by the numeral 10. System 10 includes a sensor 12 disposed on a body (not shown), such as a vehicle like an automobile, truck, plane, train or boat. Sensor 12 is positioned and configured for facilitating detection of fluid conditions through measured data, such as fluid pressure and changes thereto, in connection with a portion of the fluid generally adjacent to the outer surface of the body, particularly while the body is in motion through the fluid. Sensor 12 communicates measured data, either wired or wirelessly, to a control system 14. Measured data from sensor 12 is received via data input/output port 16.

Control system 14 further includes a processor 18 and memory 20 in communication with data port 16 and one another for purposes of analyzing the measured data and comparing the measured data with stored historic data, relationships and/or programs in memory 20. The measured data is processed by processor 18 running programs in memory 20. In particular, the measured data may be analyzed by control system 14 to detect certain conditions which may be related to the drag or opposing resistive forces resulting from movement of the body through the fluid.

System 10 is in further communication with an eddy disrupter element 22 which is configured to disrupt or otherwise cause a change in conditions of at least a portion of the fluid adjacent to the moving body. In some embodiments, eddy disrupter element 22 may include a mechanical device operatively associated with an appendage capable of alternately projecting and retracting from the plane of the body to cause a change in the fluid conditions adjacent to that portion of the moving body. In other embodiments, eddy disrupter element 22 is configured to move from a position in which eddy disrupter element 22 is substantially non-transverse or planar with respect to the outer surface of the body or substantially in contact with the outer surface of the body, to a position in which eddy disrupter is at a substantially transverse relationship with respect to the plane of the outer surface of the body. Movement of eddy disrupter element 22 may be actuated and controlled by processor 18 processing instructions or programs in memory 20 through wired or wireless communication with data port 16.

Figure 2:
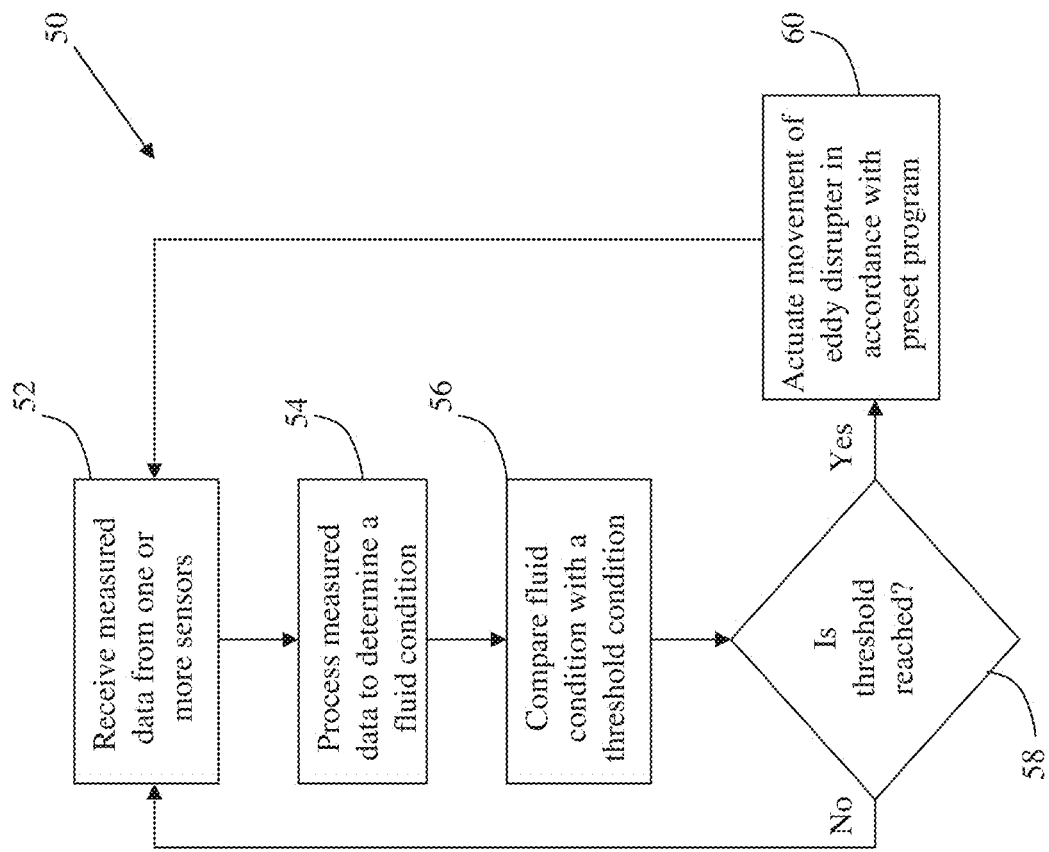
FIG. 2 is a flow diagram illustrating an exemplary method according to some embodiments of the invention which may be used in conjunction with a system such as the system shown in FIG. 1.

FIG. 2 illustrates a method according to some embodiments of the invention generally referred to by the numeral 50. For illustrative purposes, method 50 is described herein in conjunction with elements and features of system 10. As shown by step 52 of method 10, measured data is received from one or more sensors, such as sensor 12. In step 54, the measured data is processed via control system 14 to determine and compare a detected condition with a threshold condition as shown in step 56. The threshold condition may relate to a pre-established criterion, value or set of criteria. Other factors or existing conditions may be considered along with the measured data for purposes of processing and comparing conditions with the threshold condition in steps 54 and 56. For example, the environmental conditions, such as weather related conditions, acceleration or velocity of the moving body, type of vehicle, weight or vehicle loading, type of fluid (e.g., air or water) may all be used along with the measured data to develop a real-time condition profile for comparison with a threshold condition.

It should be understood that the threshold condition may be developed pursuant to any relationship or formula that is generally indicative of a drag condition which can be positively impacted through the operation of a system constructed according to the invention, such as system 10, rather than increased. The threshold condition may also be connected with indicator of operative efficiency against the resistance caused by drag, such as distance traveled per unit fuel used rate, such as knots or miles per gallon or electrical load required. Thus, the threshold may be satisfied if conditions detected determine a particular drop in a rate of travel due to drag. Furthermore, system 10 may further include a user interface which is in wired or wireless communication with control 14 for facilitating user settings of threshold conditions. For example, a user operating a vehicle with a system 10 installed therein may access the user interface to set threshold conditions such that the threshold is satisfied by a specified loss in miles per gallon or efficiency due to drag on the vehicle.

In some embodiments, the threshold condition is a preset value based on empirical, experimental or other data. In other embodiments, the threshold condition relates to a difference either between a prior taken measurement by sensor 12 or over time by sensor 12. In yet other embodiments, the threshold condition relates to a difference between more than one sensor mounted on the moving body, such as a sensor mounted at the rear surface of the moving body and a sensor mounted along a side or front surface.

In some embodiments, sensor 12 is installed on the body so that it senses fluid pressure adjacent to the outer surface thereof. In step 56, the measured fluid pressure may then be compared with a threshold pressure value.

If the threshold condition is not satisfied, then system 10 continues to receive measured data but no action is taken as shown by step 58. If the threshold is satisfied, then as shown by steps 58 and 60, control system 14 actuates movement of eddy disrupter element 22. In some embodiments, control system 14 provides for movement of eddy disrupter element 22 according to a preset program stored in memory 20 which controls the movement characteristics.

For example, the timing, including the overall time and time lapse between the threshold being reached and actuation of eddy disrupter 22, the movement waveform, the uniformity, pattern, extent and magnitude of the movement, among other things, may all be determined by a program stored in memory 20 and control system 14. The movement of eddy disrupter 22 may be periodic or non-periodic, and may differ in one or more ways in successive actuations. Such differences between such triggered "disruption events" caused by the movement of eddy disrupter 22 may be programmed, randomly generated, or otherwise. For example, the movement of eddy disrupter 22 may be based on existing conditions or the threshold satisfied, based on further information regarding the real-time rate of eddy shedding or to match or otherwise be responsive to eddy shedding. The timing for movement of the disrupter 22 may be measured in the range of seconds or even milliseconds or less. As shown by method 50, measured data will be continually received and processed in steps 52 and 54 subsequent to actuation of eddy disrupter 22 in step 60 for comparison with the threshold condition in step 58 and possible additional disrupter actuation. Thus, method 50 is capable of reducing the highly turbulent, dynamic-flow wake region directly behind or about a vehicle and the aerodynamic drag associated with such a phenomenon by continually sensing, analyzing and comparing data with the threshold which provides the ability to adapt to ever changing operative and environmental conditions.

In some embodiments, measured data may be processed and compared in steps 54 and 56 using multiple comparative relationships or to develop various analyses between the measured data and threshold conditions which may be useful to determining whether conditions exist that can be beneficially impacted by operation of eddy disrupter element 22. The threshold condition must be carefully established so that the operation of disrupter elements has a drag reducing rather than a drag increasing effect. In such embodiments, there may be more than one threshold condition used for comparison in step 58. It should be readily apparent that more than one program for actuating and controlling movement of eddy disrupter 22 may be stored in memory 20 responsive to the particular threshold condition satisfied in order to impart the most beneficial drag reducing effect according to the actual conditions sensed, among other things.

Figure 3:
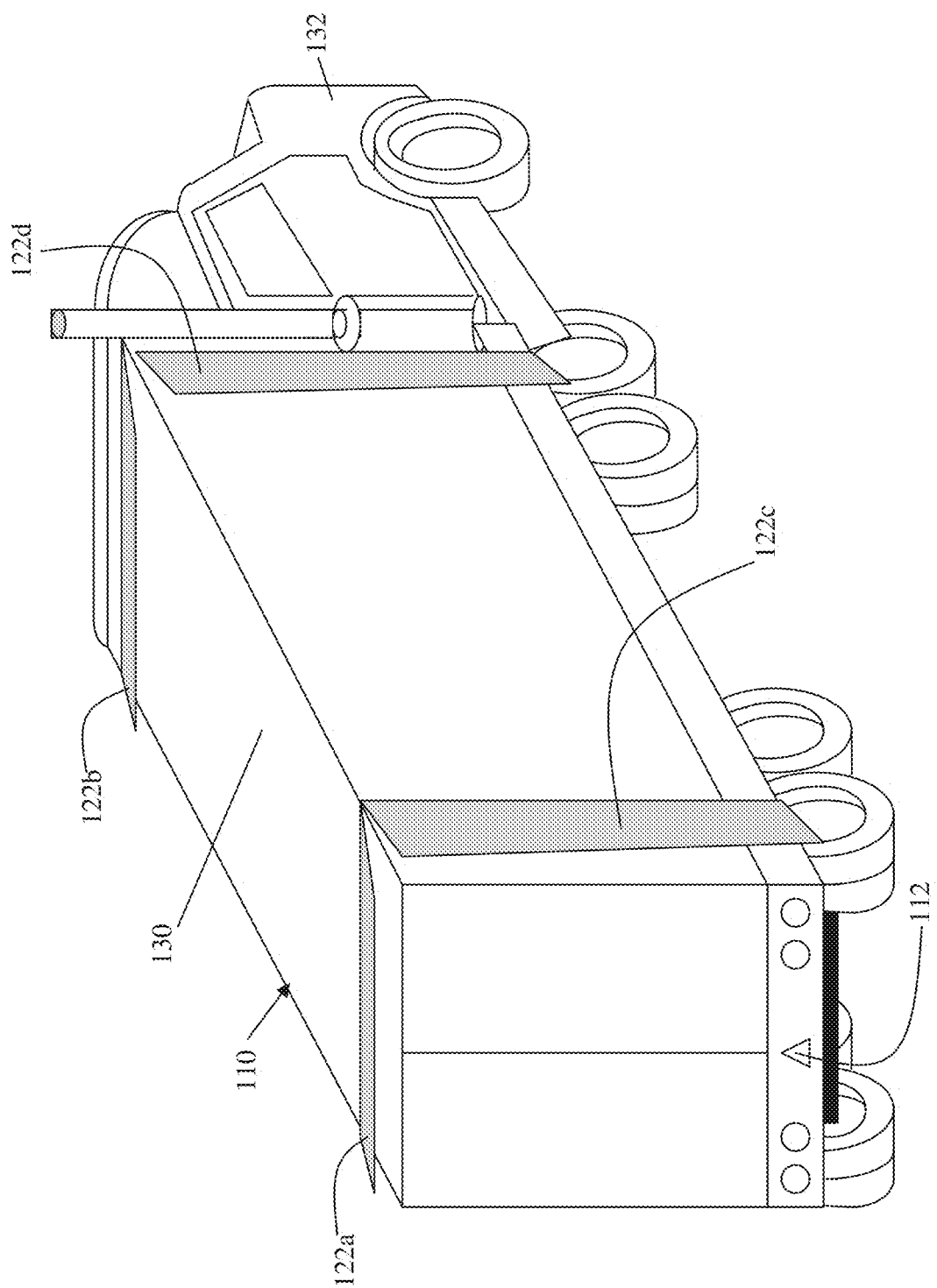
FIG. 3 is a schematic diagram illustrating a perspective view of an exemplary vehicle employing a system and method according to some embodiments of the invention.

FIG. 3 illustrates an exemplary embodiment employing a system and method constructed according to the invention which includes a trucking rig 110 consisting of a trailer portion 130 and cab portion 132. Eddy disrupter elements 122 and a sensor 112 are mounted on trailer portion 130. Sensor 112 measures conditions relating to the air adjacent to the rear surface of trucking rig 110.

As shown in FIG. 3, four elements 122 are mounted on rig 110; two elements 122*a,b* are mounted on the top and of trailer 130 and two elements 122*c,d* are mounted on the same side of trailer 130, substantially perpendicular to the top mounted elements 122*a,b*. Elements 122*a,c* and both adjacent to the rear portion of trailer 130 whereas elements 122*b,d* are both adjacent to the front portion of trailer 130. Elements 122 are generally elongated and rectangular panels mounted on trailer 130 along a front-facing (with respect to the orientation of rig 110) longitudinal edge thereof for pivotal motion with respect to the surface plane of trailer 130. It should be understood that elements 122 may be mounted and employed differently and in other locations along the moving body, and that any moving body, such as a car, train or plane for example, may be employed with elements 122. It should also be understood that only one element 122 may be employed in any location, such as on the outer surface of the air dam on top of cab 132, or elsewhere, and may be of any length. An element 122 may also be divided into multiple, separately actuated panels that function similarly to individual moving flaps, which may further facilitate a reduction on the power to operate the panel and an increase in response time or mobility.

A control system (not shown), which may be similar to control system 14, is installed in any suitable location on rig 110, such as within the dashboard electronics in cab 132. Measured data from sensor 112 is processed and compared with a threshold condition. Elements 122*a,b,c,d* are individually responsive to the control system. Upon satisfaction of the threshold condition, one or more elements 122 are actuated for movement and may pivot along a front side edge such that the opposing side projects from the plane of the surface of trailer 130 and forms an angle relative thereto when viewed along a cross-sectional profile. The angle formed may be about 0 degrees to about 90 degrees. When the threshold condition is not satisfied, elements 122 may be substantially flush or planar with respect to the outer surface of trailer 130.

It should be understood that eddy disrupter elements may be employed which are not pivotally mounted by which instead are configured to extend in a transverse direction relative to the surface of rig 110 or any vehicle in which the system of the invention is employed upon satisfaction of a threshold condition, but otherwise remains embedded within or otherwise mounted on the vehicle in such a way as to avoid causing drag when not deployed. For example, an eddy disrupter element may be configured to project outwardly from the vehicle surface to be in a transverse position relative to the surface and fully or partially retract within a port defined in the vehicle to cause minimal drag.

In operation, rig 110 is driven along a road or highway while sensor 112 is continually sensing conditions, such as fluid pressure, and relaying the sensed conditions to the internal control system for processing and comparison with threshold conditions. It should be readily apparent that the driver may at least in part control the establishment of threshold conditions through a user interface in cab 132, as discussed above. One or more of the eddy disrupter elements 122 may be continually actuated as conditions relating to drag are compared with threshold conditions while rig 110 is driven.

Figure 4:
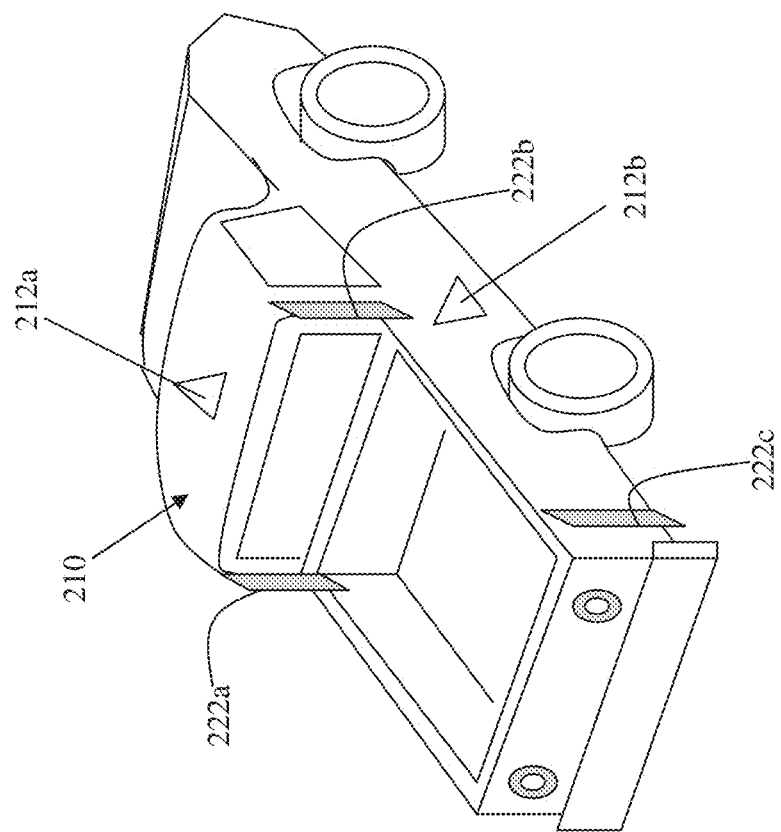
FIG. 4 is a schematic diagram illustrating a perspective view of another exemplary vehicle employing a system and method according to some embodiments of the invention.

FIG. 4 provides another exemplary embodiment in which a system and method according to the invention is installed in a pickup truck 210. Pickup 210 includes sensors 212*a* and 212*b*, wherein sensor 212*a* is mounted on the roof of passenger compartment 234 of truck 210 while sensor 212*b* is mounted on a side surface of truck 210. Eddy disrupter elements 222*a,b* are installed on opposing sides of truck 210 adjacent to passenger compartment 234 while element 222*c* is installed on a side of truck 210 adjacent to the rear bumper. Elements 222*a,b,c* are also rectangular panels which are mounted on a front side edge thereof for pivotal motion relative to the surface of truck 210. Elements 222*a,b* are planar with truck 210 but project rearward from passenger compartment 234 when not actuated thus effectively extending the side surface when not actuated. One or more of elements 222 are respond to a threshold condition being satisfied by pivoting outwardly so that the rear side edge projects from the plane of the surface of truck 210, similar to the manner in which elements 122 operate.

Figure 6:
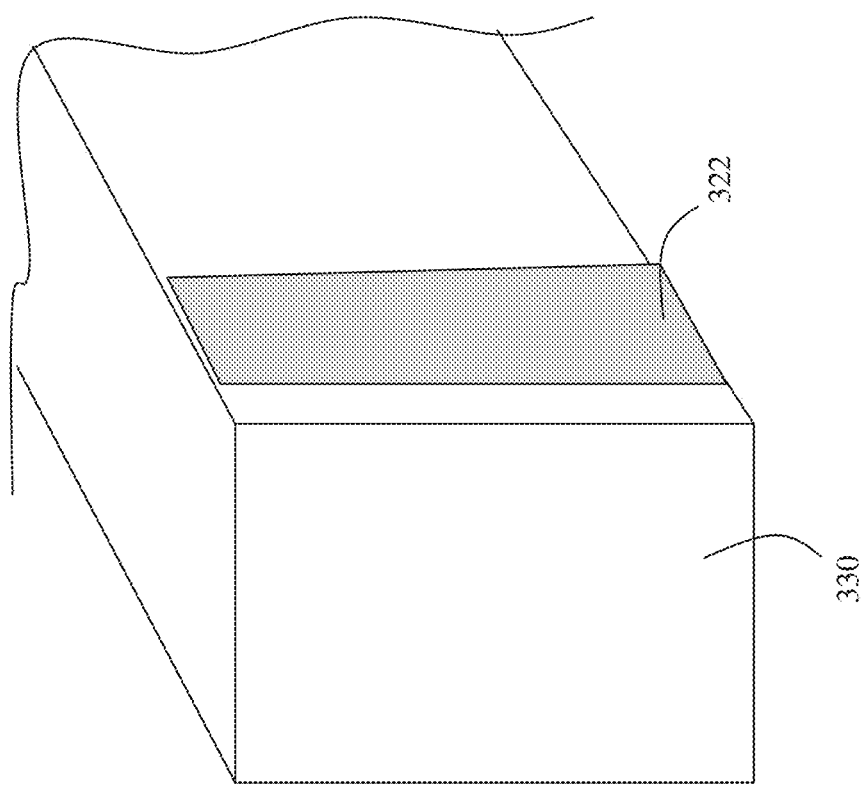
FIG. 6 is a schematic diagram illustrating the portion of an exemplary vehicle employing a system and method according to some embodiments of the invention as shown in FIG. 5, and further depicting an eddy disrupter element of some embodiments of the invention in a transverse position with respect to the vehicle surface.
Figure 5:
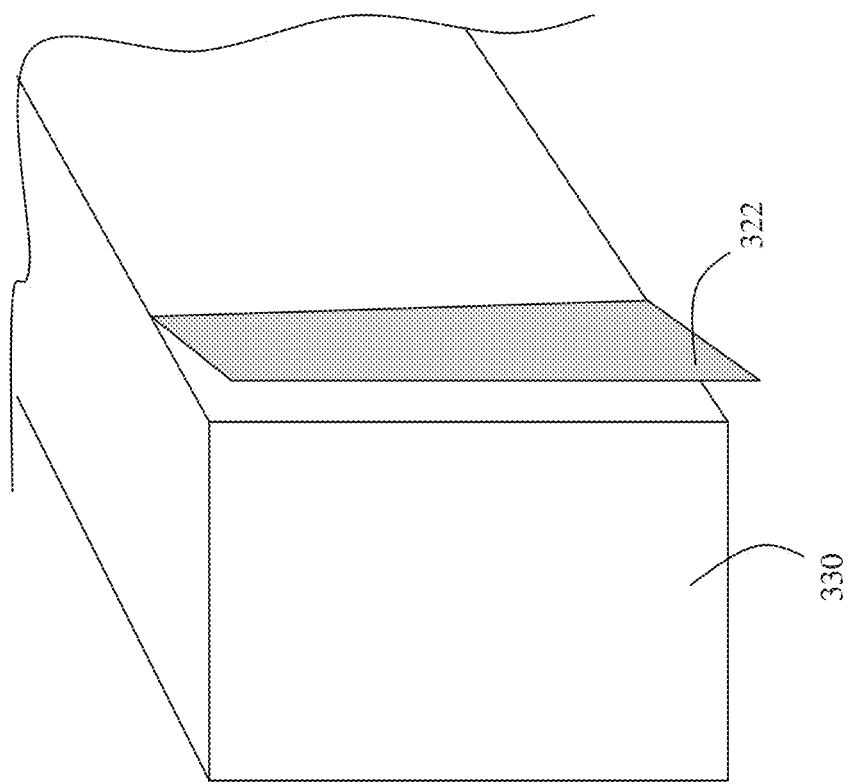
FIG. 5 is a schematic diagram illustrating a portion of an exemplary vehicle employing a system and method according to some embodiments of the invention, and further depicting an eddy disrupter element of some embodiments of the invention in a substantially non-transverse position with respect to the vehicle surface.

FIGS. 5 and 6 are intended to illustrate the actuated and non-actuated positions along with the pivoting motion of element 322 which is mounted on a trailer 330 and operates in similar fashion to element 122*c* on trailer 132. As shown in FIG. 5, element 322 is in a non-actuated position, substantially planar with the outer surface of trailer 330. FIG. 6 depicts the actuated position responsive to satisfaction of a threshold condition in which element 322 pivots about a front side edge so that the rear edge thereof projects outwardly into the air forming an angle with respect to the side surface of trailer 330.

FIG. 7 illustrates, among other things, examples of shapes and sizes of eddy disrupter elements which may be employed with the invention. It should be readily apparent that the size, shape, amount and position of the eddy disrupters may vary. Furthermore, element may be mounted on any side. The examples shown include element 422 which is substantially rectangular. Element 522 has a substantially arcuate and scalloped cross sectional profile with varying thickness. Element 622 has a varying latitudinal shape and thickness. Element 722 is substantially triangular in shape and element 822 is cylindrical.

Those skilled in the art will readily appreciate that methods and systems of the embodiments of the present invention may include various computer and network related software and hardware, such as programs, operating systems, memory storage devices, input/output devices, processors, servers, data communication links, whether wireless or otherwise, and data transceiving devices, as well as mechanical and electromechanical hardware, such as motors, mounting support, hinges or other equipment as necessary to securely mount and cause the controlled movement action of the eddy disrupter elements. Those skilled in the art will further appreciate that the precise types of such software and hardware are not vital to the full implementation of the invention as described herein an exemplified in the disclosed embodiments.

Further to the description above, the system of the invention provides an adaptive, closed loop drag reduction device which integrates computer controls with motivated (that is, controlled and moveable) eddy disrupting elements mounted on the body of the vehicle. These eddy disrupting elements may be pneumatic, hinged, motor-driven, vertical or horizontal flaps, posts, screens, appendages or other geometric or non-geometric shapes that may be capable of both reducing wake size, and in some embodiments, maximizing the pressure at the rear of the vehicle (e.g., truck trailer) by protruding movement, such as pivotal movement outward from the plane formed by the surface of the vehicle. The element may be rapidly deployed at a variety of magnitudes. The control system may be fed physical measurement data including vehicle speed and the pressure at one or more locations on the vehicle, such as adjacent to the rear or directly behind the trailer, and through any existing computerized control systems. The system may be self-adapting to changing operating conditions (operating close to real-time responses), so the system will yield a good gain in performance under almost all conditions encountered.

Initial testing of some embodiments of the invention has demonstrated significant efficiency gains which, if scalable to a full size class 8 tractor trailer, would represent a transformational technology for road-going vehicles. While fixed position drag reduction designs can reduce drag by 10-15%, for example, the present technology has capabilities of reducing drag by 45% or more. High speed video images can help to demonstrate the impact of this technology on vehicle drag. The drag force on tractor/trailers is governed by the generation of eddies, or rotating pockets of air, that are generated in the wake downstream of the trailer. As these unsteady eddies are formed, they create high velocities in the air along the rear of the trailer. High velocities equate to low pressure and the low pressure is responsible for most of the drag force on the trailer. Eddies are formed from each side of the trailer and form at a periodic rate if the trailer is traveling at a constant speed.

A system constructed in accordance with the invention was also implemented and tested on a small scale in the wind tunnel facility. Several flaps were attached at the rear vertical edge of a hollow box. These flaps were operated by small motors located inside the box. This setup was utilized to simulate the geometry of a trailer, while also fitting within the working region of the available wind tunnel. The primary design variables were optimized initially to minimize the drag reading produced in the wind tunnel. After the drag force was measured, results from earlier tests required both the prototype software control loop and the design parameters to be adjusted from run to run via an optimization algorithm. Design variables were retested and evaluated using different parameters. Each successive generation of design parameters produced a better result to the point where the drag force produced by the best design was so low it could not be accurately measured. Modifying the variables produced some unexpected outcomes, leading to modifications for the final design. A sample set of aerodynamic drag results are pictured in FIG. 8.

Figure 8:
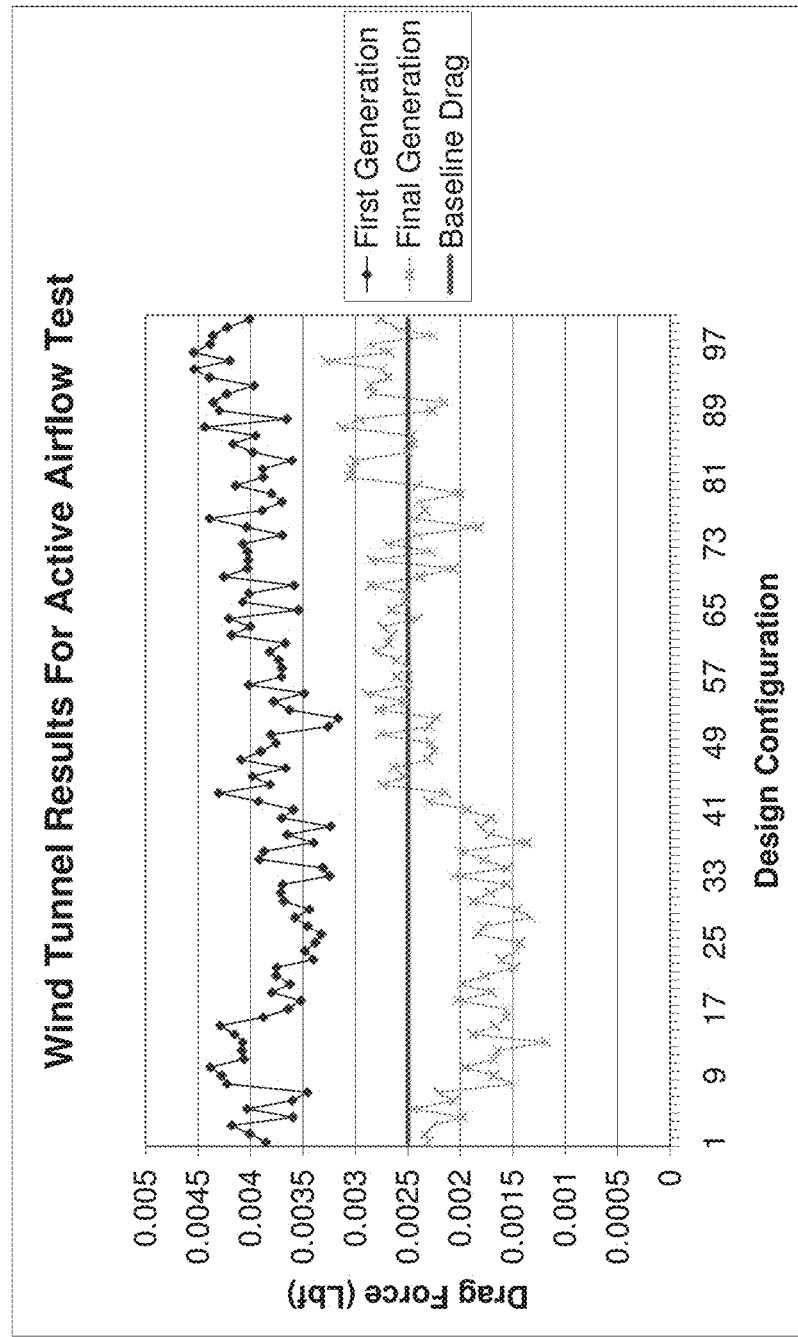
FIG. 8 is a graph illustrating wind tunnel results for active airflow testing of 100 various test designs constructed in accordance with the invention and employing an embodiment of the method of the invention in order to reduce drag force, among other things.

Several interesting observations can be drawn from FIG. 8. At the first iteration, all designs actually added rather than reduced drag as shown by the upper line plotted on the graph in FIG. 8. This is what one would likely expect, since if the design is not optimized, the action of the disrupter elements or flaps acting in the wake actually creates more drag, not less, which is represented in the greater pound-force (lbf) than even the baseline drag. At the final iteration, however, in which the system and method had been optimized to receive a sensed condition and be appropriately responsive to actuate the eddy disrupter upon satisfaction of a threshold condition, among other things as described above, the drag had been reduced by over 50% in some of the embodiments as shown in the lower line plotted on the graph. The full scale equivalent wind speed is relatively low due to a limitation of flap speed, but the results were repeatable. High speed cameras were utilized to visualize the flow differences in the wake with and without the active airflow device in operation. The deductions from closely observing the film support the positive impact produced by the final design.

Small scale wind tunnel testing has already validated the concept in a well controlled environment. Additional variables measured include pressure readings and fuel mileage increases. The panels may be positioned substantially in the plane of the vehicle surface so that they create no elevation over the surface of the vehicle (e.g., be embedded in the surface so that they do not protrude from the vehicle surface and create drag or disruption when not in an extended state). The plates may also be retrofit onto vehicles where they are not embedded, but slightly protrude over the surface of the vehicle. This may impact flow over the vehicle surface, but that effect is minimal compared to the benefits of overall drag reduction. In both initial construction of the system into vehicles or in retrofitting, the electronics (e.g., motor, wire, FPGA, ASIC, processor, etc.) should be protected to some degree or as much as possible from the elements, and be located within the vehicle, within recesses or within housing specifically for the electronics. Due to potential damage from shifting loads and the like, any wiring within the vehicle should be provided with protection against abrasion and other damaging contact, and may even use metal casing to protect wires.

Systems of the invention are not only dynamic but also adaptive, utilizing real-time feedback control and presenting few if any operational issues. In spite of the years of research and expenditures, the system and method described herein is the first to show a substantial increase in miles per gallon for the long haul trucking industry. This technology could be quickly integrated into existing U.S. trailer fleets and easily installed in new models with minimal added cost to the industry. There is also the very real potential to modify the technology to incorporate it into other makes and models of vehicles.

The system and method of the invention are transformational in their beneficial impact on the trucking industry and the reduction in U.S. fuel consumption. Large trucks account for over 12% of the total US petroleum use while delivering over 75% of the nations goods. At highway speeds, aerodynamic drag accounts for almost 70% of the vehicle energy expenditure. For each percentage point reduction in the drag force, a gain of 0.5% in fuel economy is expected. This means that a 40% reduction in vehicle drag force can provide a 20% gain in fuel economy. This in turn, when factored into the total miles driven by large trucks in the United States—on average 130,000 miles annually—results in an expected fuel consumption reduction of almost 7 billion gallons of fuel per year, representing over a 3% reduction in required US petroleum imports. The projected savings (over $15 billion per year) resulting from such a gain in fuel economy increases the competitiveness of U.S. truck manufacturers, enables carrier companies to rehire into the over 171,000 positions lost since 2007, and could lower the cost of all goods transported by large trucks. With easy and relatively inexpensive installation on existing vehicles or integration into new trailer production, and by not impeding normal vehicle operation, barriers to entry into the trucking market have been greatly reduced.

A second impact of the successful implementation of the system and method described herein is the reduction in greenhouse gases generated and released to the atmosphere. As the fuel consumption of large vehicles is reduced, so is the production of carbon dioxide as well as nitrous oxide and diesel particulates. A 20% gain in fuel efficiency translates into tens if not hundreds of millions of tons of carbon dioxide per year which is not released into the atmosphere by the combustion process. As the transportation industry accounts for over 27% of greenhouse gas emissions and is still increasing each and every year, the impact of the system and method described herein is both transformational and significant.

Commercial implementation initially will be retrofits of existing trailers and involve hundreds of newly created shops or expanded facilities at many of the existing carrier operations as well as independently owned service facilities. This, in turn, could generate hundreds if not thousands of new jobs. Additionally, the major trailer manufacturers would create new skilled jobs to assemble the active flow control devices and to devise new means of integrating embodiments of the system and method of the invention into new trailer designs that also could incorporate other drag reducing technologies. There is reason to believe that, if successful, embodiments of the invention can also be beneficial to smaller vehicles, perhaps even to the traditional automotive fleet if incorporated into new designs.

The system and method disclosed herein may be generally described as including a vehicle that has reduced drag when it moves through fluids. The vehicle body has front, rear, side, top and bottom surfaces. At least the rear surface of the vehicle body causes drag as the vehicle moves through a fluid. There is at least one sensor on the vehicle body that senses conditions, such as pressure changes, having a physical relationship with drag on at least the rear surface of the vehicle body as the vehicle moves through the fluid. There is a processor receiving signals from the sensors relating to sensed pressure changes. There is at least one element on at least one surface of the vehicle body forward of the rear surface of the vehicle that is capable of being moved in relation to the at least one surface in response to signals from the processor. A program is executable by the processor that sends signals to the at least one element while the vehicle is moving causing the at least one element to move in a manner that will at least partially and physically disrupt at least some eddies on the at least one surface before the eddies reach the rear surface of the vehicle body. The disruption of the eddies reduces overall drag on the vehicle as the vehicle moves through the fluid. The vehicle can be an on-road vehicle (such as car, motorcycle, truck, trailer, semi-trailer, van and the like, and therefore, the fluid is air. However, the vehicle may also be a water operating vessel such as a ship or boat.

A truck employing the invention, for example, may have a body that is at least about 6 meters long, at least about 8 meters long, at least about 10 meters long or longer (e.g., double-bodied or tandem bodies). The elements mounted thereon may comprise at least one moveable element (preferably a panel) moveable on at least one surface of the vehicle body to disrupt eddies in advance of the rear surface. The at least one element may be present on at least one surface selected from the group consisting of a top surface of the vehicle and side surfaces of the vehicle. Where the element is a panel and moves relative to the at least one surface, a motor that moves the at least one panel can respond to signals from the processor to move along a hinge at least about 10 degrees of movement in less than one second, less than about 0.1 seconds and even less than about 0.001 seconds (e.g., about 1 to about 100 milliseconds). The at least one sensor preferably senses pressure on a rear surface of the vehicle, although pressure changes on any surface indicating creation of drag-causing flow patterns is useful. The at least one panel may be present on at least one surface of the vehicle selected from the group consisting of a top surface of the vehicle and side surfaces of the vehicle, the at least one surface has a length, and the at least one panel is located at least 25% of said length away from said rear surface, or at least 50% of said length, and even 100% of the length (e.g., on the front of the trailer top surface, or even on the cab surface in advance of the trailer). The elements may also be on the sides of the trailer (or cab) and underneath the trailer (or cab).

The processors are connected to motivating elements associated with the panels, and the response times for the panels and motivating elements should be rapid. Because the system is dealing with real time events, response times between the sensor, the processor and the motivator can be less than about 5 seconds, less than about 2 seconds, less than about 1 second, and possibly measured in the millisecond (e.g., less than about 0.01 second response times) or even microsecond ranges (less than about 0.001 second response time). For example, as signals representing pressure changes are sent to the processor, the program in the processor should actually cause a change in the panel positions in less than the time frame identified. As the pressure changes occur on a continuous time frame basis, and change frequently, the faster the response time, the greater the impact of the system.

It is to be noted that the term "panel" is used to describe the element that disrupts the flow patterns, the swirl patterns or the vortices. The term panel, unless the terms "flat panel" or "curved panel" are used to more specifically define the element, is generic to any element that physically extends above the vehicle surface(s) to alter the fluid movement patterns over that surface, and could include moveable tubular elements, non-geometric designs, fingers, posts, and the like.

It is also to be noted that even though various positions of the panels on the surfaces of the vehicles have been identified, the positioning of the panels anywhere on the vehicle where drag is created in the fluid stream can be useful, at the very front of the vehicle to the most rearward positions on the vehicle.

In some embodiments, the method of reducing drag on a vehicle moving through a fluid can be described as sensing pressure changes on a surface of a vehicle, said pressure changes having a relationship to drag on the vehicle. The sensors send signals relating to the sensed pressure changes to a processor on the vehicle. The processor, in response to receiving signals relating to the sensed pressure changes, causes elements on at least one surface of the vehicle to move and to disrupt eddies formed or forming on the at least one surface, the disrupting of eddies reducing drag on the vehicle and reducing the dust carried into the wake.

In other embodiments, a method of breaking up eddies on the vehicle body surface in real time is provided, rather than providing a fixed design or position of an element attempting to reduce drag produced by relative air movement on a moving body. This method and apparatus physically breaks up eddies by movement of a geometric form on a surface of the body to disrupt or prevent adverse eddy formation and translation on the surface. The eddy disruption modifies rear air pressure behind a rear of the body such that the rear air pressure is closer to a frontal air pressure on a front of the body during relative air movement. A system according to the invention does not have to include inletting an amount of air from a boundary flow around the body and forming a pressure shell behind the rear of the body. However, systems and methods of the invention may be combined with other drag reduction techniques to add further advantages.

While systems and methods of the invention have been described herein, it should be understood that these descriptions, along with descriptions of exemplary applications or embodiments of such systems and methods, have been provided herein to be illustrative of the invention and its many features. Various modifications can be made by those skilled in the art without departing from the scope and spirit of the invention, even if such modifications have not been described herein. Therefore, this disclosure should not be considered as limiting of the underlying invention in any way. Accordingly, the invention embraces alternatives, modifications and variations which fall within the spirit and scope of this disclosure and claims.

What is claimed is:

1. A vehicle comprising:
   a vehicle body including a front end, an opposite rear end, a top surface, and first and second side surfaces extending between the opposite front and rear ends; and
   a drag reduction system including:
   an eddy disrupter element mounted on a surface of a vehicle body and movable with respect to the vehicle body, the eddy disrupter element including an elongated panel and a motor coupled to the elongated panel, the elongated panel extending between a first end and a second end, the first end pivotably coupled to the vehicle body, the motor configured to move the elongated panel between a first position including the second end positioned adjacent to the surface of the vehicle body and a second position including the second end spaced a distance outwardly from the surface of the vehicle body;
   at least one sensor mounted to the vehicle body and configured to measure air fluid pressure adjacent to the vehicle body; and
   a processor programmed to:
   receive signals indicating measured air fluid pressure from the at least one sensor;
   compare the measured air fluid pressure received from the at least one sensor with a threshold condition associated with drag resulting from the vehicle body moving through air fluid to determine if the threshold condition is satisfied; and
   operate the eddy disrupter element to adjust a position of the elongated panel relative to the surface of the vehicle body upon determining the threshold condition is satisfied.

2. The vehicle of claim 1, wherein the at least one sensor is mounted at, or near, the rear end of the vehicle body.

3. The vehicle of claim 1, wherein the threshold condition includes a predefined fluid pressure value.

4. The vehicle of claim 3, wherein the threshold condition includes a velocity of the vehicle.

5. The vehicle of claim 1, wherein the drag reduction system includes a first sensor mounted near the rear end of the vehicle body for measuring air fluid pressure adjacent to a rear surface of the vehicle body and a second sensor mounted near the front end of the vehicle body for measuring air fluid pressure adjacent to a front surface of the vehicle body.

6. The vehicle of claim 1, wherein the processor is programmed to operate the eddy disrupter element through a plurality of movements between the first and second positions upon determining the threshold condition is satisfied.

7. The vehicle of claim 6, wherein the processor is programmed to operate the eddy disrupter element through the plurality of movements for a predefined period of time.

8. The vehicle of claim 1, wherein the processor is programmed to continually measure fluid pressure changes on the surface of the vehicle body.

9. The vehicle of claim 1, wherein the processor is programmed to operate the motor to pivot the elongated panel through at least 10 degrees of movement in less than a second of time.

10. The vehicle of claim 1, wherein the eddy disrupter element is mounted adjacent to the rear end of the vehicle body.

11. A system for reducing drag on a vehicle, comprising:
    an eddy disrupter element mounted on a surface of a vehicle body and movable with respect to the vehicle body, the eddy disrupter element including an elongated panel and a motor coupled to the elongated panel, the elongated panel extending between a first end and a second end, the first end pivotably coupled to the vehicle body, the motor configured to move the elongated panel between a first position including the second end positioned adjacent to the surface of the vehicle body and a second position including the second end spaced a distance outwardly from the surface of the vehicle body;
    at least one sensor mounted to the vehicle body and configured to measure air fluid pressure adjacent to the vehicle body; and
    a processor programmed to:
    receive signals indicating measured air fluid pressure from the at least one sensor;
    compare the measured air fluid pressure received from the at least one sensor with a threshold condition associated with drag resulting from the vehicle body moving through air fluid to determine if the threshold condition is satisfied; and
    operate the eddy disrupter element to adjust a position of the elongated panel relative to the surface of the vehicle body upon determining the threshold condition is satisfied.

12. The system of claim 11, wherein the at least one sensor is mounted at, or near, the rear end of the vehicle body.

13. The system of claim 11, wherein the threshold condition includes a predefined fluid pressure value.

14. The system of claim 13, wherein the threshold condition includes a velocity of the vehicle.

15. The system of claim 11, further comprising a first sensor mounted near the rear end of the vehicle body for measuring air fluid pressure adjacent to a rear surface of the vehicle body and a second sensor mounted near the front end of the vehicle body for measuring air fluid pressure adjacent to a front surface of the vehicle body.

16. The system of claim 11, wherein the processor is programmed to operate the eddy disrupter element through a plurality of movements between the first and second positions upon determining the threshold condition is satisfied.

17. The system of claim 16, wherein the processor is programmed to operate the eddy disrupter element through the plurality of movements for a predefined period of time.

18. The system of claim 11, wherein the processor is programmed to continually measure fluid pressure changes on the surface of the vehicle body.

19. The system of claim 11, wherein the processor programmed to operate the motor to pivot the elongated panel through at least 10 degrees of movement in less than a second of time.

20. A method of operating a system for reducing drag on a vehicle, the system including at least one sensor coupled to the vehicle and configured to measure air fluid pressure adjacent to the vehicle, an eddy disrupter element mounted to a surface of the vehicle, and a processor coupled the plurality of sensors and the eddy disrupter element, the eddy disrupter element including an elongated panel and a motor coupled to the elongated panel, the elongated panel extending between a first end and a second end, the first end pivotably coupled to the vehicle body, the motor configured to move the elongated panel between a first position including the second end positioned adjacent to the surface of the vehicle body and a second position including the second end spaced a distance outwardly from the surface of the vehicle body, the method including the processor performing the steps of:
   receiving signals indicating measured air fluid pressure from the at least one sensor;
   comparing the measured air fluid pressure received from the at least one sensor with a threshold condition associated with drag resulting from the vehicle body moving through air fluid to determine if the threshold condition is satisfied; and
   operating the eddy disrupter element to adjust a position of the elongated panel relative to the surface of the vehicle body upon determining the threshold condition is satisfied.

* * * * *